US009805087B2

(12) United States Patent
Saner

(10) Patent No.: US 9,805,087 B2
(45) Date of Patent: *Oct. 31, 2017

(54) CLEANER WITH BROWSER MONITORING

(71) Applicant: Piriform Ltd., Nicosia (CY)

(72) Inventor: Guy Saner, St. James (BB)

(73) Assignee: PIRIFORM LTD., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,711

(22) Filed: Feb. 10, 2016

(65) Prior Publication Data

US 2016/0306843 A1  Oct. 20, 2016

Related U.S. Application Data

(63) Continuation of application No. 13/869,547, filed on Apr. 24, 2013, now Pat. No. 9,262,464.

(51) Int. Cl.
*G06F 17/30* (2006.01)
*H04L 29/08* (2006.01)

(52) U.S. Cl.
CPC .. *G06F 17/30371* (2013.01); *G06F 17/30117* (2013.01); *H04L 67/02* (2013.01)

(58) Field of Classification Search
None
See application file for complete search history.

(56) References Cited

U.S. PATENT DOCUMENTS

| 6,405,362 B1 | 6/2002 | Shih et al. |
| 7,069,324 B1 | 6/2006 | Tiwana et al. |
| 2002/0178232 A1* | 11/2002 | Ferguson ........... G06Q 30/0251 709/217 |
| 2003/0225822 A1* | 12/2003 | Olson ................. G06F 9/5072 709/202 |
| 2004/0059863 A1* | 3/2004 | Andrew ........... G06F 17/30135 711/1 |
| 2007/0122105 A1* | 5/2007 | Fukuda ............. G06F 17/3002 386/265 |
| 2011/0270892 A1 | 11/2011 | Chou et al. |
| 2014/0089355 A1* | 3/2014 | Fu .................... G06F 12/0253 707/813 |

OTHER PUBLICATIONS

Final Office Action dated Jun. 2, 2016 for related U.S. Appl. No. 13/853,772.
Non-Final Office Action dated Feb. 23, 2017 for related U.S. Appl. No. 13/853,772.
Non-Final Office Action dated Mar. 23, 2017 for related U.S. Appl. No. 15/019,914.

\* cited by examiner

*Primary Examiner* — Syed Hasan
(74) *Attorney, Agent, or Firm* — Miles & Stockbridge PC

(57) ABSTRACT

A cleaning application that can monitor one or more browser applications that are executed on a computer, and that can, for at least one browser application, clean at least one of one or more files or a registry associated with the at least one browser application is provided. The cleaning application can include a cleaning module. The cleaning module can monitor one or more browser applications that are executed on a computer. The cleaning module can further detect a closing of at least one browser application. The cleaning module can further perform a pre-defined action in response to the closing of the at least one browser application. The pre-defined action can include cleaning at least one of one or more files or a registry associated with the at least one browser application.

24 Claims, 6 Drawing Sheets

CLEANER WITH BROWSER MONITORING

BACKGROUND

Field

Certain embodiments of the invention relate generally to computer systems, and, more particularly, to registry and file cleaning computer systems.

Description of the Related Art

A computer contains one or more computer files (i.e., files), where a file is a resource that stores data that can be accessed by a computer program that is executed within the computer. A computer also contains a registry, where a registry is a hierarchical database that is stored on the computer and stores configuration settings and options for the computer.

During the lifetime of a computer, thousands of files can end up being stored on the computer. Many of these files may never be used by any software modules that are executed within the computer. Thus, these files are unused files that merely take up storage space of the computer, and potentially slow down the processing speed of the computer. A file cleaning software module, when executed on the computer, can identify unused files and delete them from the computer.

Similarly, during the lifetime of the computer, a registry can become bloated with numerous configuration entries. In certain cases, many of the entries are not used by any computer program. For example, when a new version of a computer program is installed on the computer, the registry may be updated to contain a new entry corresponding to the new version. However, the old entry corresponding to the older version may not be deleted. Thus, a large number of entries in the registry may be superfluous. Similar to a file cleaning software module, a registry cleaning software module, when executed on the computer, can identify unused entries in a registry, and delete them from the registry.

SUMMARY

According to an embodiment of the invention, a method includes monitoring, by a cleaning module executed on a computer, one or more browser applications that are executed on the computer. The method further includes detecting, by the cleaning module, a closing of at least one browser application of the one or more browser applications. The method further includes performing, by the cleaning module, a pre-defined action on the computer.

According to another embodiment, an apparatus includes a memory configured to store a cleaning module. The apparatus further includes a processor configured to execute the cleaning module stored on the memory. The processor is further configured, when executing the cleaning module stored on the memory, to, monitor one or more browser applications that are executed on a computer, detect a closing of at least one browser application of the one or more browser applications, and perform a pre-defined action on the computer.

According to another embodiment, a non-transitory computer-readable medium includes a computer program stored thereon that, when executed by a processor, causes the processor to implement a method. The method includes monitoring one or more browser applications that are executed on a computer. The method further includes detecting a closing of at least one browser application of the one or more browser applications. The method further includes performing a pre-defined action on the computer.

According to another embodiment, an apparatus includes means for monitoring one or more browser applications that are executed on a computer. The apparatus further includes means for detecting a closing of at least one browser application of the one or more browser applications. The apparatus further includes means for performing a pre-defined action on the computer.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
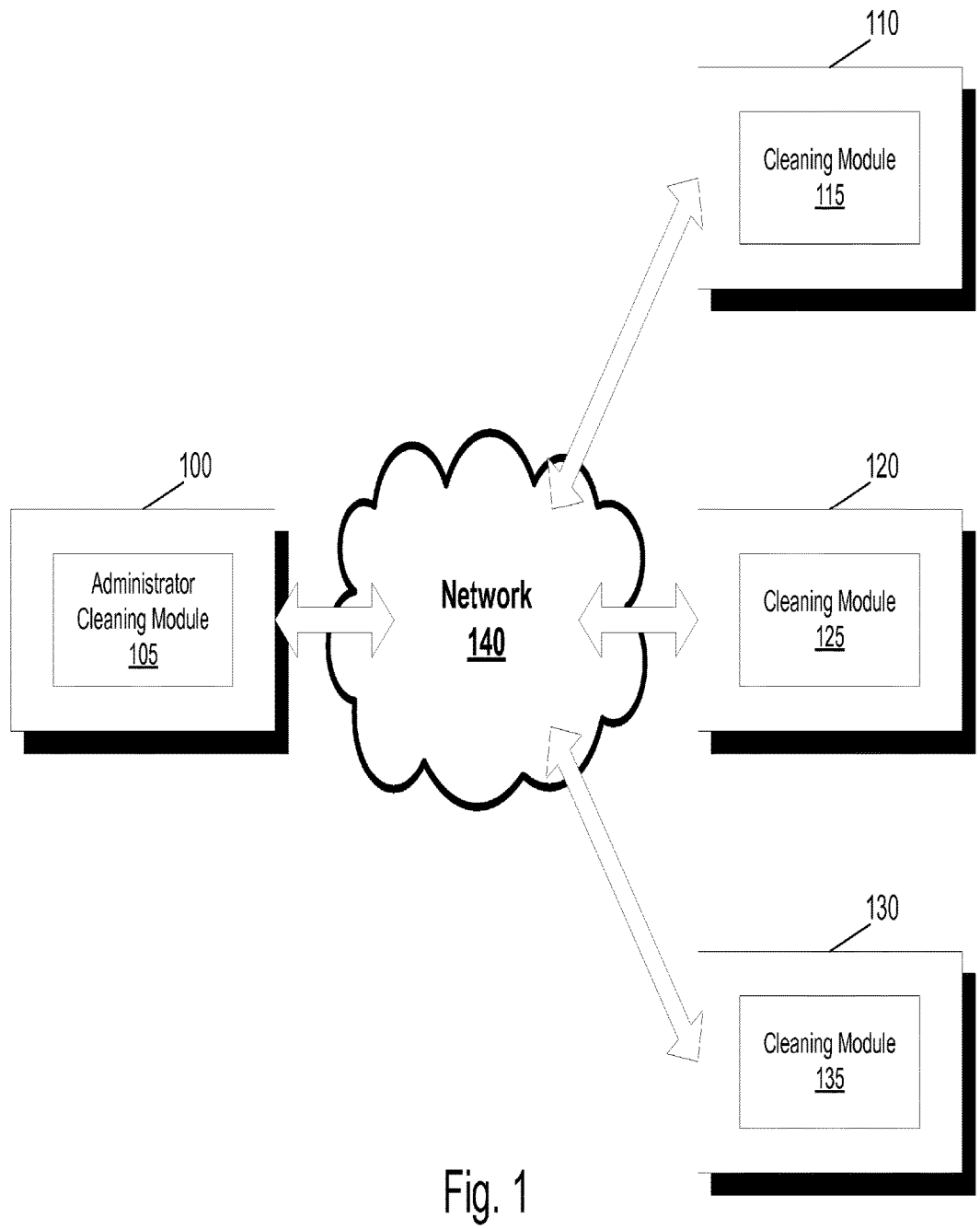
FIG. 1 illustrates a block diagram of a system, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

A "computer," as understood by one of ordinary skill in the art, is any programmable machine that receives input, automatically stores and manipulates data, and provides output. A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers. A "browser application, "browser," "web browser application," "web browser," "Internet browser application," or "Internet browser" is an application configured to retrieve, present, and traverse information resources over the Internet, such as the World Wide Web. Examples of a browser application include Microsoft® Internet Explorer®, Mozilla® Firefox®, Apple® Safari®, Opera®, and Google® Chrome®.

In addition, a "service" or "web service," as understood by one of ordinary skill in the art, is a module or application designed to support interoperable computer-to-computer interaction over a network. A service can have an interface described in a computer-processable format. A computer can interact with a service by sending messages over a network protocol. Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

According to an embodiment of the invention, a cleaning application can monitor one or browser applications that are executed on a computer. Upon a detection of a closing of a browser application, the cleaning application can perform a pre-defined action on the computer. For example, upon a detection of a closing of a browser application, the cleaning application can clean at least one of one or more files of a computer or a registry associated with the browser application. Specifics of the file cleaning and registry cleaning are described below in greater detail. The cleaning application can include a cleaning module and can optionally also include an administrative cleaning module.

FIG. 1 illustrates a block diagram of a system, according to an embodiment of the invention. The system can include computers 100, 110, 120, and 130. Computers 100, 110, 120, and 130 can each be any type of computer known in the art, such as a microcomputer, a personal computer, a desktop computer, a laptop computer, a notebook computer, a Palm-top computer, a server, a tablet computer, a smartphone, a smartbook, a personal digital assistant (PDA), a minicomputer, a mainframe computer, a supercomputer, a workstation, or an embedded computer. One of ordinary skill in the art would readily appreciate that the number of computers illustrated in FIG. 1 is merely an example number according to the embodiment, and that, in alternate embodiments, the system can include any number of computers.

The system can also include network 140. Network 140 can be any type of network that is known in the art, such as a local area network (LAN), a wide area network (WAN), a personal area network (PAN), a home area network (HAN), a campus area network (CAN), a metropolitan area network (MAN), a global area network (GAN), a storage area network (SAN), a virtual private network (VPN), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, or a hierarchical topology network. According to the embodiment, computer 100 can establish a connection with any of computers 110, 120, and 130 over network 140 using a network protocol. The network protocol can be any communication protocol that is known in the art, such as an Internet Protocol (IP), a Transmission Control Protocol (TCP), a User Datagram Protocol (UDP), an Internet Control Message Protocol (ICMP), a Hypertext Transfer Protocol (HTTP), a Post Office Protocol (POP), a File Transfer Protocol (FTP), or an Internet Message Access Protocol (IMAP). According to an embodiment, the network protocol can be a secured network protocol, and the connection between computer 100 and any of computers 110, 120, and 130 can be a secured connection. In the embodiment illustrated in FIG. 1, computer 100 can establish a connection with the three computers in the system, i.e., computers 110, 120, and 130, over network 140. However, this is merely an example, and in alternate embodiments, a computer can establish a connection with any number of computers over a network. Further, in alternate embodiments, network 140 can be omitted, and computers 100, 110, 120, and 130 can be separate and unconnected to each other.

According to the embodiment, computer 100 can include administrator cleaning module 105. Administrator cleaning module 105 is a module that is executed by computer 100. Administrator cleaning module 105 can remotely deploy one or more cleaning modules (such as cleaning modules 115, 125, and 135) to computers 110, 120, and 130 over network 140. Administrator cleaning module 105 can also remotely manage file and registry cleaning performed by the deployed one or more cleaning modules. In certain embodiments, the system does not include administrator cleaning module 105.

Also according to the embodiment, computer 110 can include cleaning module 115, computer 120 can include cleaning module 125, and computer 130 can include cleaning module 135. Cleaning modules 115, 125, and 135 are each modules that are executed by computers 110, 120, and 130, respectively. Cleaning modules 115, 125, and 135 can each perform file and registry cleaning on computers 110, 120, and 130, respectively. More specifically, cleaning modules 115, 125, and 135 can each monitor a browser application and perform a pre-defined action in response to a detection of a closing of the browser application, where the pre-defined action can include file and registry cleaning for the browser application. In certain embodiments, the file and registry cleaning can be managed by administrator cleaning module 105. However, in embodiments where administrator cleaning module 105 is omitted from the system, cleaning modules 115, 125, and 135 can manage their own respective file and registry cleaning. The functionality of cleaning modules 115, 125, and 135 is described below in greater detail in relation to FIG. 2.

Figure 2:
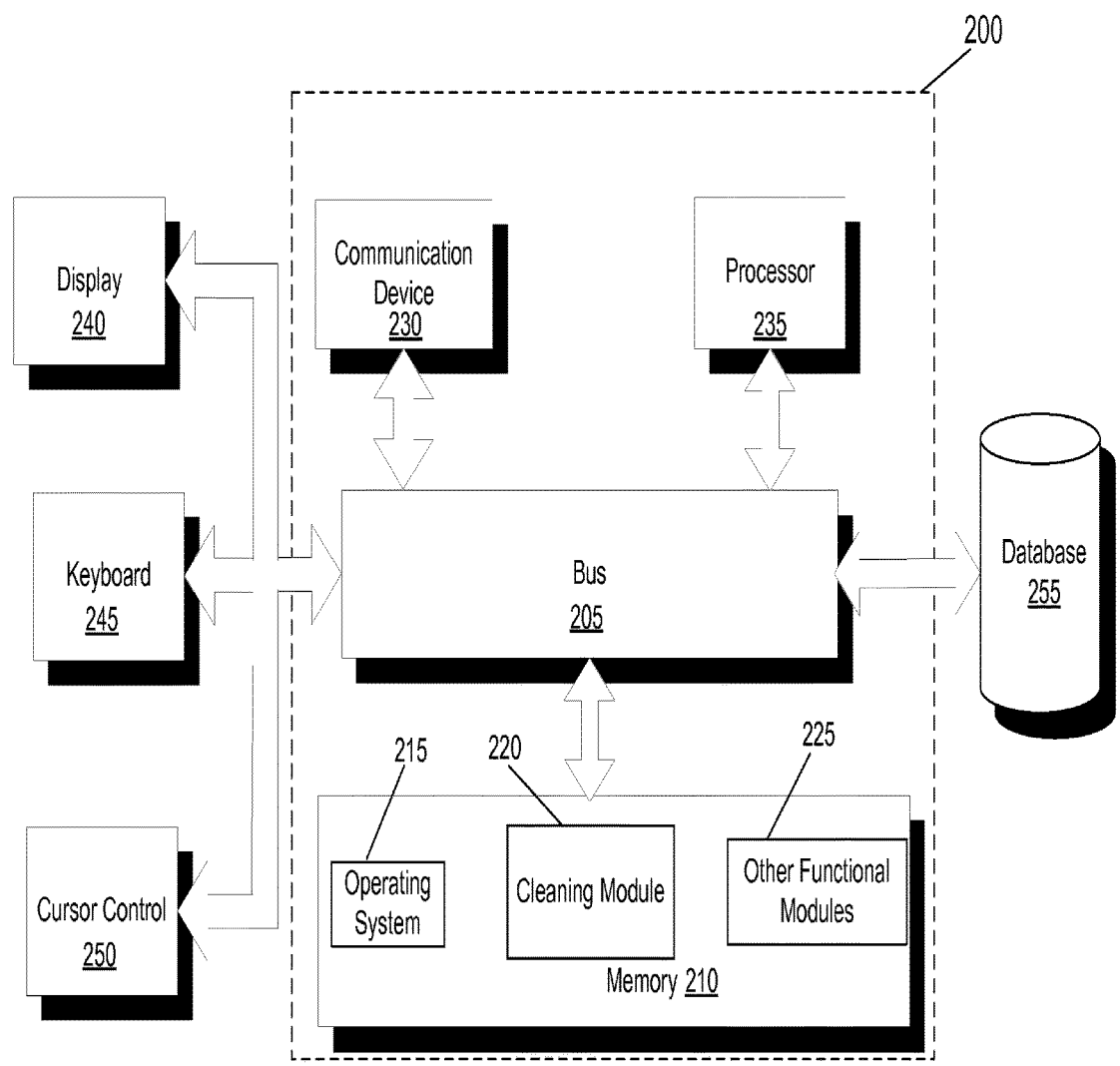
FIG. 2 illustrates a block diagram of an apparatus that implements a cleaning module, according to an embodiment of the invention.

FIG. 2 illustrates a block diagram of an apparatus 200 that implements a cleaning module 220, according to an embodiment of the invention. In one embodiment of the invention, apparatus 200 is a computer similar to computers 110, 120, and 130 of FIG. 1. Apparatus 200 includes a bus 205 or other communication mechanism for communicating information between components of apparatus 200. Apparatus 200 also includes a processor 235, operatively coupled to bus 205, for processing information and executing instructions or operations. Processor 235 may be any type of general or specific purpose processor. Apparatus 200 further includes a memory 210 for storing information and instructions to be executed by processor 235. Memory 210 can be comprised of any combination of random access memory (RAM), read only memory (ROM), static storage such as a magnetic or optical disk, or any other type of machine or computer-readable medium. Apparatus 200 further includes a communication device 230, such as a network interface card or other communication interface, to provide access to a network. As a result, a user may interface with apparatus 200 directly, or remotely through a network or any other method. In addition, apparatus 200 may interface with any other computers or devices through a network.

A computer-readable medium may be any available medium that can be accessed by processor 235. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disc read-only memory (CD-ROM), or any other form of storage medium known in the art.

Processor 235 can also be operatively coupled via bus 205 to a display 240, such as a Liquid Crystal Display (LCD). Display 240 can display information to the user. A keyboard 245 and a cursor control device 250, such as a computer mouse, can also be operatively coupled to bus 205 to enable the user to interface with apparatus 200.

According to one embodiment, memory 210 can store software modules that may provide functionality when executed by processor 235. The modules can include cleaning module 220. Cleaning module 220 can monitor a browser application and perform a pre-defined action in response to a detection of a closing of the browser application, where the pre-defined action can include cleaning one or more files and/or a registry associated with a browser application. According to the embodiment, the modules can also include an operating system 215, as well as other functional modules 225. Operating system 215 can provide an operating system functionality for apparatus 200. Apparatus 200 can also be part of a larger system. Thus, apparatus 200 can include one or more additional functional modules 225 to include additional functionality for the system.

Processor 235 can also be operatively coupled via bus 205 to a database 255. Database 255 can store data in an integrated collection of logically-related records or files. Database 255 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
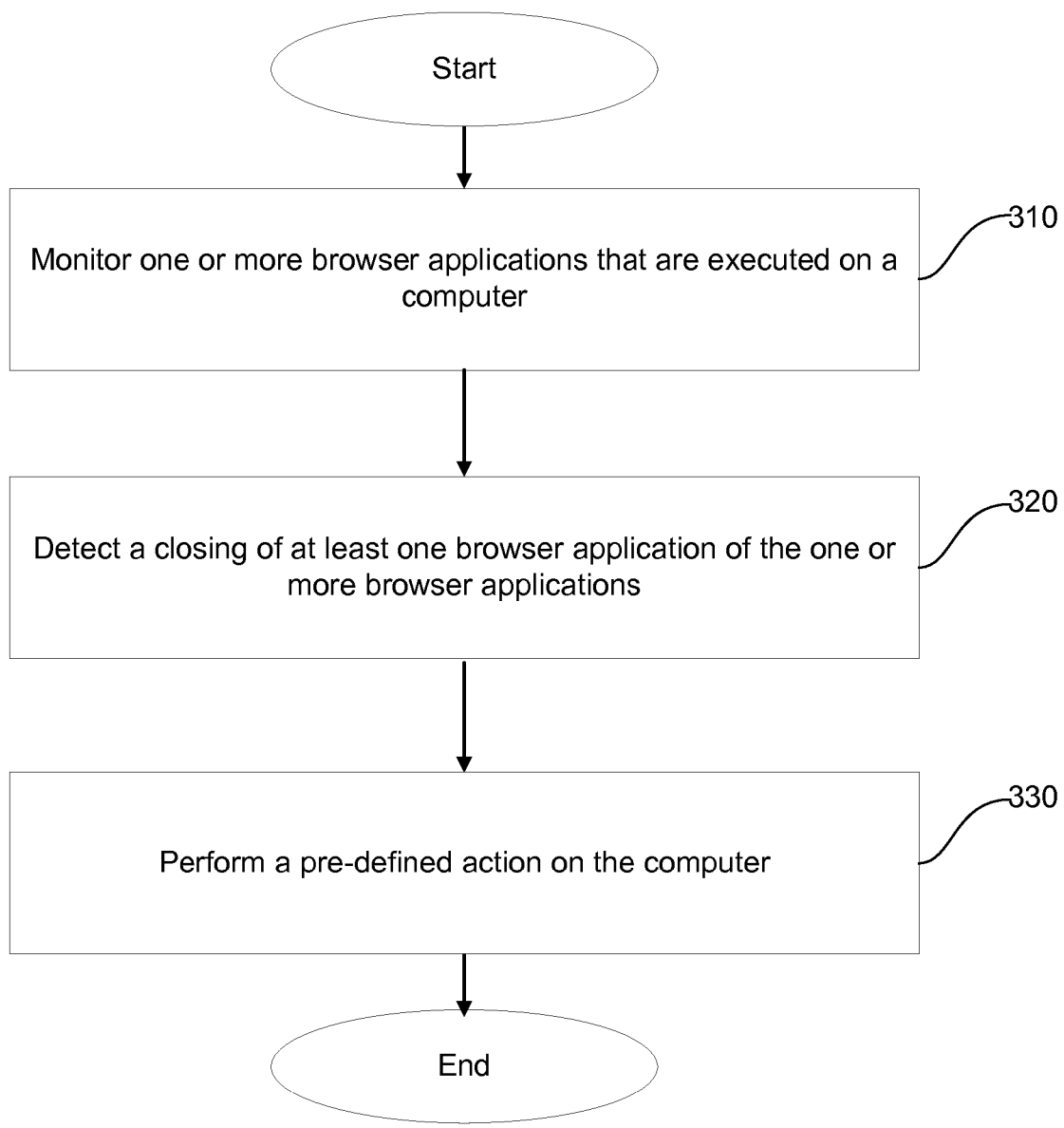
FIG. 3 illustrates a flow diagram of a method, according to an embodiment of the invention.
Figure 4:
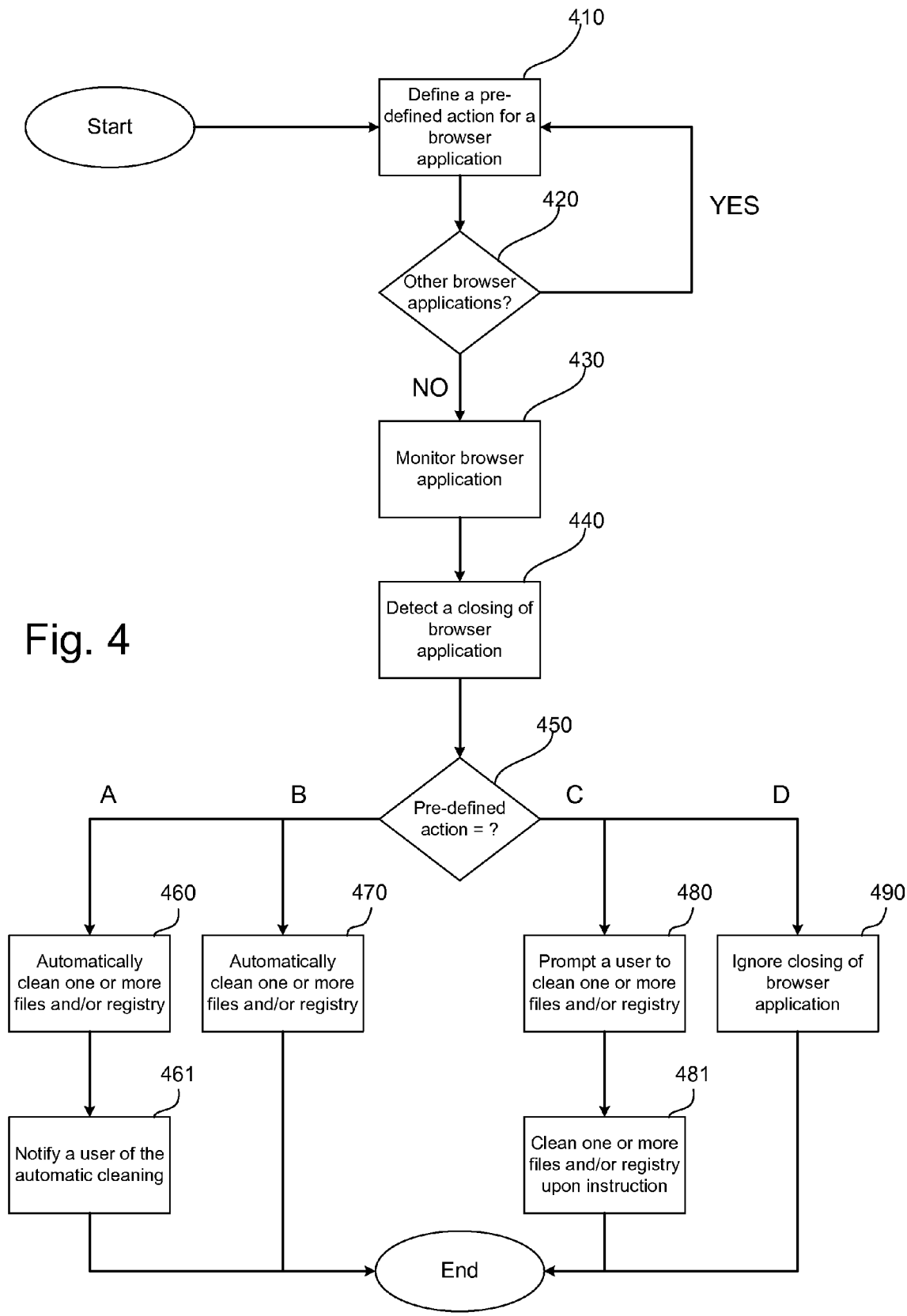
FIG. 4 illustrates a flow diagram of a method for monitoring a browser application and performing a pre-defined action in response to a detection of a closing of the browser application, according to an embodiment of the invention.

FIGS. 3 and 4 each illustrate a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

FIG. 3 illustrates a flow diagram of a method, according to an embodiment of the invention. In one embodiment, the method can be implemented by a cleaning module executed on a computer. As previously described, a cleaning module can monitor a browser application and perform a pre-defined action in response to a detection of a closing of the browser application, where the pre-defined action can include cleaning one or more files and/or a registry associated with a browser application.

According to the embodiment, the method begins, and at step 310, one or more browser applications that are executed on a computer are monitored. In certain embodiments, the monitoring of the one or more browser applications includes monitoring one or more computer programs or modules that constitute the one or more browser applications, as the computer programs or modules are executed on the computer. The method then proceeds to step 320.

At step 320, a closing of at least one browser application of the one or more browser applications is detected. In certain embodiments, the closing of the at least one browser application includes a termination of the one or more computer programs or modules that constitute the at least one browser application. The method then proceeds to step 330.

At step 330, a pre-defined action is performed on the computer. In certain embodiments, the method further includes defining the pre-defined action for the at least one browser application. Further, in certain embodiments, the pre-defined action is one of: automatically cleaning at least one of one or more files or a registry associated with the at least one browser application, and notifying a user of the computer of the automatic cleaning; automatically cleaning at least one of one or more files or a registry associated with the at least one browser application; prompting the user of the computer to clean at least one of one or more files or a registry associated with the at least one browser application, and cleaning at least one of one or more files or a registry associated with the at least one browser application in response to receiving an instruction to clean from the user of the computer; or ignoring the closing of the at least one browser application. In certain embodiments, the prompting the user of the computer further includes displaying a window within a user interface, where the window prompts the user of the computer to clean at least one of one or more files or a registry associated with the at least one browser application. Further, in certain embodiments, the one or more browser applications includes a plurality of browser applications installed on the computer, and a unique pre-defined action is defined for each browser application that is installed on the computer.

In certain embodiments, the cleaning, or the automatic cleaning, is based on an instruction and a cleaning rule set. In some of these embodiments, the cleaning module includes one or more cleaning rules, the cleaning rule includes one or more cleaning rule identities, each cleaning rule identity corresponds to a unique cleaning rule, and a cleaning rule includes a set of one or more parameters for cleaning at least one of one or more files or a registry associated with the at least one browser application. Further, in some of these embodiments, each cleaning rule identity corresponds to either a system cleaning rule, an application cleaning rule, or a registry cleaning rule. Even further, in some of these embodiments, the cleaning, or the automatic cleaning, one or more files or a registry associated with the at least one browser application further includes, for each cleaning rule that corresponds to each cleaning rule identity, at least one of the following: removing one or more files from the computer; removing data from one or more files; removing one or more registry entries from the computer; or removing data from one or more registry entries, based on the cleaning rule. In certain embodiments, the at least one browser application of the computer can be optimized, where the optimizing is based on an instruction to optimize the at least one browser application and a cleaning rule set. The cleaning of the one or more files associated with the at least one browser application, and the cleaning of the registry associated with the at least one browser application, are each further described below in greater detail. After step 330, the method ends.

FIG. 4 illustrates a flow diagram of a method for monitoring a browser application and performing a pre-defined action in response to a detection of a closing of the browser application, according to an embodiment of the invention. According to one embodiment, the following steps can be part of a method for cleaning one or more files and/or a registry of a computer.

In the embodiment, the flow begins, and, at step 410, a cleaning module defines a pre-defined action for a browser application. In certain embodiments, the cleaning module identifies a browser application that is installed on a computer. In these embodiments, the cleaning module defines the pre-defined action for the browser application, so that, upon a closing of the browser application, the pre-defined action can be performed. In certain embodiments, the pre-defined action can be defined by a user of the cleaning module, where the user selects an action from a list of actions displayed within a user interface of the cleaning module. An example of a user interface of the cleaning module is described in greater detail in relation to FIGS. 5 and 6.

In certain embodiments, the pre-defined action is one of: (a) automatically cleaning at least one of one or more files or a registry associated with the browser application, and notifying a user of the computer of the automatic cleaning; (b) automatically cleaning at least one of one or more files or a registry associated with the browser application; (c) prompting the user of the computer to clean at least one of one or more files or a registry associated with the browser application, and cleaning at least one of one or more files or a registry associated with the browser application in response to receiving an instruction to clean from the user of the computer; or (d) ignoring the closing of the browser application. The flow then proceeds to step 420.

At step 420, the cleaning module determines whether other browser applications are installed on the computer, for which a pre-defined action has not been defined. In certain embodiments, a plurality of browser applications can be installed on the computer. Further, in some of these embodiments, the cleaning module can define a unique pre-defined action for each browser application that is installed on the computer. If it is determined that other browser applications are installed on the computer, for which a pre-defined action has not been defined, the flow proceeds back to step 410. However, if it is determined that there are no browser applications installed on the computer, for which a pre-defined action has not been defined (i.e., that all browser applications installed on the computer have a pre-defined action that has been defined), then the flow proceeds to step 430.

At step 430, the cleaning module monitors a browser application that is executed on the computer. In certain embodiments, the cleaning module monitors one or more computer programs or modules that constitute the browser application, as the computer programs or modules are executed on the computer. Further, in certain embodiments, the cleaning module can monitor a plurality of browser applications that are executed on the computer. The flow then proceeds to step 440.

At step 440, the cleaning module detects a closing of the browser application. In certain embodiments, the closing of the browser application is indicated by a termination of one or more computer programs or modules that constitute the browser application. Further in certain embodiments, the cleaning module can detect a plurality of closings of a plurality of browser applications. The flow then proceeds to step 450.

At step 450, the cleaning module determines whether the pre-defined action for the browser application is: (a) automatically cleaning at least one of one or more files or a registry associated with the browser application, and notifying a user of the computer of the automatic cleaning; (b) automatically cleaning at least one of one or more files or a registry associated with the browser application; (c) prompting the user of the computer to clean at least one of one or more files or a registry associated with the browser application, and cleaning at least one of one or more files or a registry associated with the browser application in response to receiving an instruction to clean from the user of the computer; or (d) ignoring the closing of the browser application. If the pre-defined action for the browser application is (a), the flow proceeds to step 460. If the pre-defined action for the browser application is (b), the flow proceeds to step 470. If the pre-defined action for the browser application is (c), the flow proceeds to step 480. If the pre-defined action for the browser application is (d), the flow proceeds to step 490.

At step 460, the cleaning module automatically cleans one or more files and/or a registry associated with the browser application. In certain embodiments, a file and/or registry are "associated" with (or "correspond" to) the browser application if the browser application utilizes the file and/or registry. The cleaning of the one or more files and/or registry associated with the browser application is further described below in greater detail. The flow then proceeds to step 461. At step 461, the cleaning module notifies a user of the cleaning module of the automatic cleaning. In certain embodiments, the cleaning module notifies the user by displaying a notification within a user interface of the cleaning module. The flow then ends.

At step 470, the cleaning module automatically cleans one or more files and/or a registry associated with the browser application. In certain embodiments, as previously described, a file and/or registry are "associated" with (or "correspond" to) to the browser application if the browser application utilizes the file and/or registry. As also previously described, the cleaning of the one or more files and/or registry associated with the browser application is further described below in greater detail. In contrast to step 460, the cleaning module does not notify the user of the automatic cleaning. The flow then ends.

At step 480, the cleaning module prompts a user to clean one or more files and/or a registry associated with the browser application. In certain embodiments, the cleaning module prompts the user by displaying a window within a user interface of the cleaning module. In these embodiments, the window prompts the user of the computer to clean one or more files and/or a registry associated with the browser application. The flow then proceeds to step 481. At step 481, upon receiving an instruction to clean the one or more files and/or the registry associated with the browser application, the cleaning module cleans one or more files and/or a registry associated with the browser application. In certain embodiments, the cleaning module receives the instruction, when the user "clicks" within the windows displayed within the user interface. In certain embodiments, as previously described, a file and/or registry are "associated" with (or "correspond" to) to the browser application if the browser application utilizes the file and/or registry. As also previously described, the cleaning of the one or more files and/or registry associated with the browser application is further described below in greater detail. The flow then ends.

At step 490, the cleaning module ignores the closing of the browser application. Thus, the cleaning module does not clean the one or more files and/or the registry associated with the browser application. The flow then ends. In certain embodiments, some or all of steps 450, 460, 461, 470, 480, 481, or 490 can be performed for each browser application of a plurality of browser applications.

Figure 5:
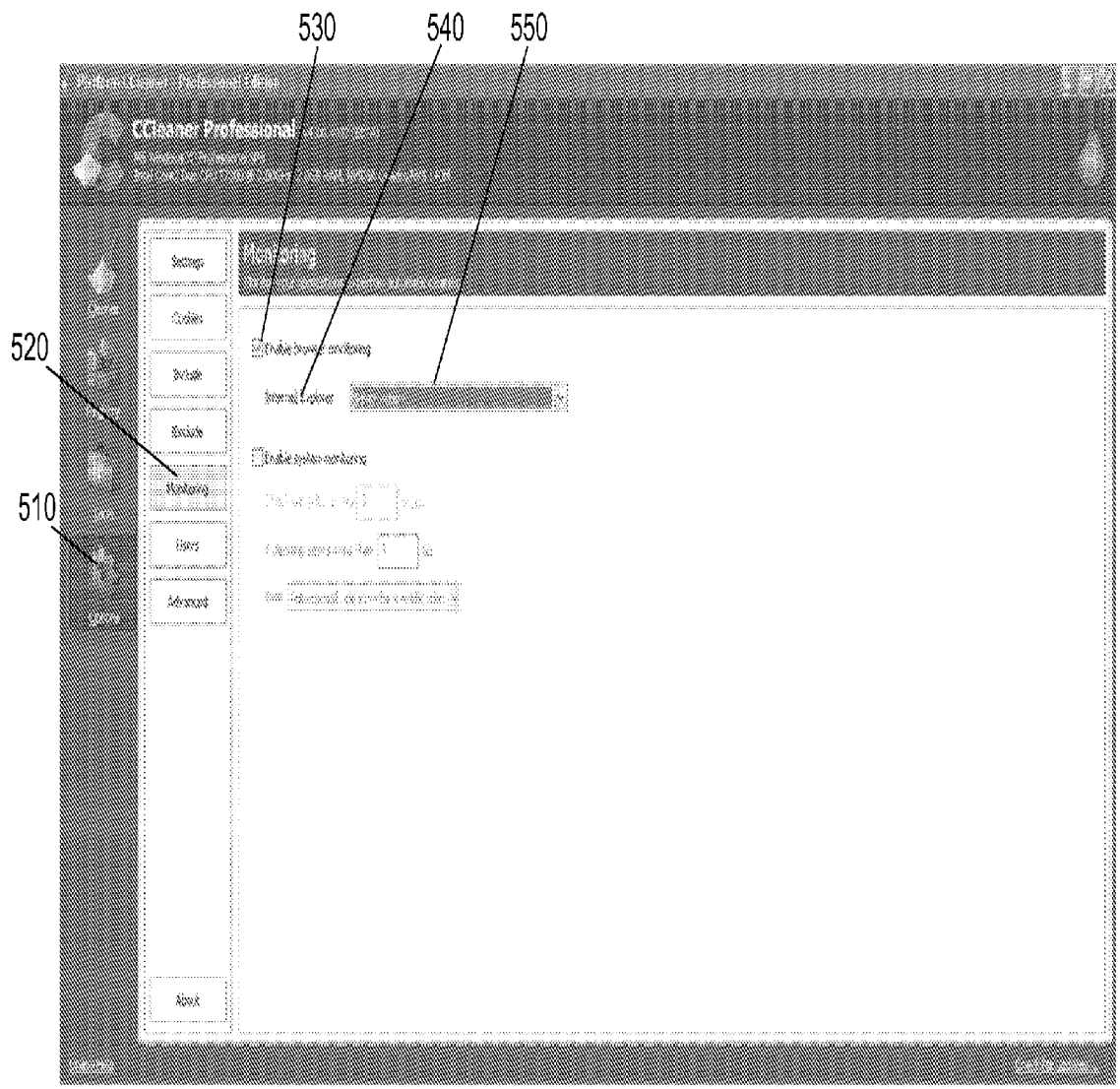
FIG. 5 illustrates a user interface of a cleaning module, according to an embodiment of the invention.

FIG. 5 illustrates a user interface that can be created by a cleaning module, executed on a computer, where the user interface is displayed to a user at a screen of the computer. However, as one of ordinary skill in the art would readily appreciate, the user interface illustrated in FIG. 5 is merely an example user interface according to an embodiment of the invention. In alternate embodiments, the cleaning module may display a user interface that has a different appearance from the user interface illustrated in FIG. 5. In one embodiment, the user interface can be a separate web service that can be executed by the cleaning module, where the cleaning module is executed on the computer. In another embodiment, the user interface can be a separate application programming interface (API) that can be executed by the cleaning module, where the cleaning module is executed on the computer. Furthermore, in alternate embodiments, the cleaning module may not display a user interface to a user. In some of these embodiments, a user interfaces with the cleaning module using a web interface. A web interface allows a user to interface with the cleaning module over a network connection, such as the Internet. The user can connect with the cleaning module, for example, over HTTP. The web interface can be located at the same computer of the cleaning module, or a separate computer, depending on the embodiment. In other alternate embodiments, there is no user interface associated with the cleaning module, whatsoever.

FIG. 5 illustrates a user interface of a cleaning module, according to an embodiment of the invention. According to the embodiment, the user interface displayed in FIG. 5 is an example user interface that can be displayed before the cleaning module monitors a browser application and performs a pre-defined action in response to a detection of a closing of the browser application.

According to the embodiment, the user interface can display an options tab 510. In the illustrated embodiment, in response to a user "clicking" options tab 510, the user interface can display one or more options for configuring the cleaning module, such as configuring the cleaning module to monitor a browser application and perform a pre-defined action in response to a detection of a closing of the browser application, where the pre-defined action can include cleaning one or more files and/or a registry associated with a browser application. More specifically, in response to a user "clicking" options tab 510, the user interface can display a plurality of configuration tabs.

According to the illustrated embodiment, the plurality of configuration tabs can include monitoring tab 520. In response to a user "clicking" monitoring tab 520, the user interface can display one or more options for defining a pre-defined action for each browser application of one or more browser applications installed on a computer. More specifically, the user interface can display browser application monitoring indication 530, browser application indication 540, and action indication 550. Browser application monitoring indication 530 displays an indication of whether monitoring of one or more browser applications is enabled. By "clicking" on browser application monitoring indication 530, a user can either enable or disable monitoring of one or more browser applications. Browser application indication 540 displays a name of a browser application that is installed on the computer. In the illustrated embodiment of FIG. 5, browser application indication 540 displays the name "Internet Explorer" because the Microsoft® Internet Explorer® browser application is installed on the computer. Action indication 550 displays a selection window that includes a list of one or more pre-defined actions that can be defined for the browser application displayed within browser application indication 540. As described below in greater detail in relation to FIG. 6, by "clicking" on action indication 550, a user can select a pre-defined action from the list of one or more pre-defined actions displayed within the selection window, and can define the selected pre-defined action for the browser application displayed within browser application indication 540.

While in the illustrated embodiment, the user interface displays a single name of a browser application within browser application indication 540, in alternate embodiments where multiple browser applications are installed on the computer, the user interface can display multiple browser application names within browser application indication 540. In these alternate embodiments, for each browser application name displayed within browser application indication 540, the user interface can display a separate selection window within action indication 550. Thus, a user can select a unique pre-defined action for each browser application installed on the computer.

Figure 6:
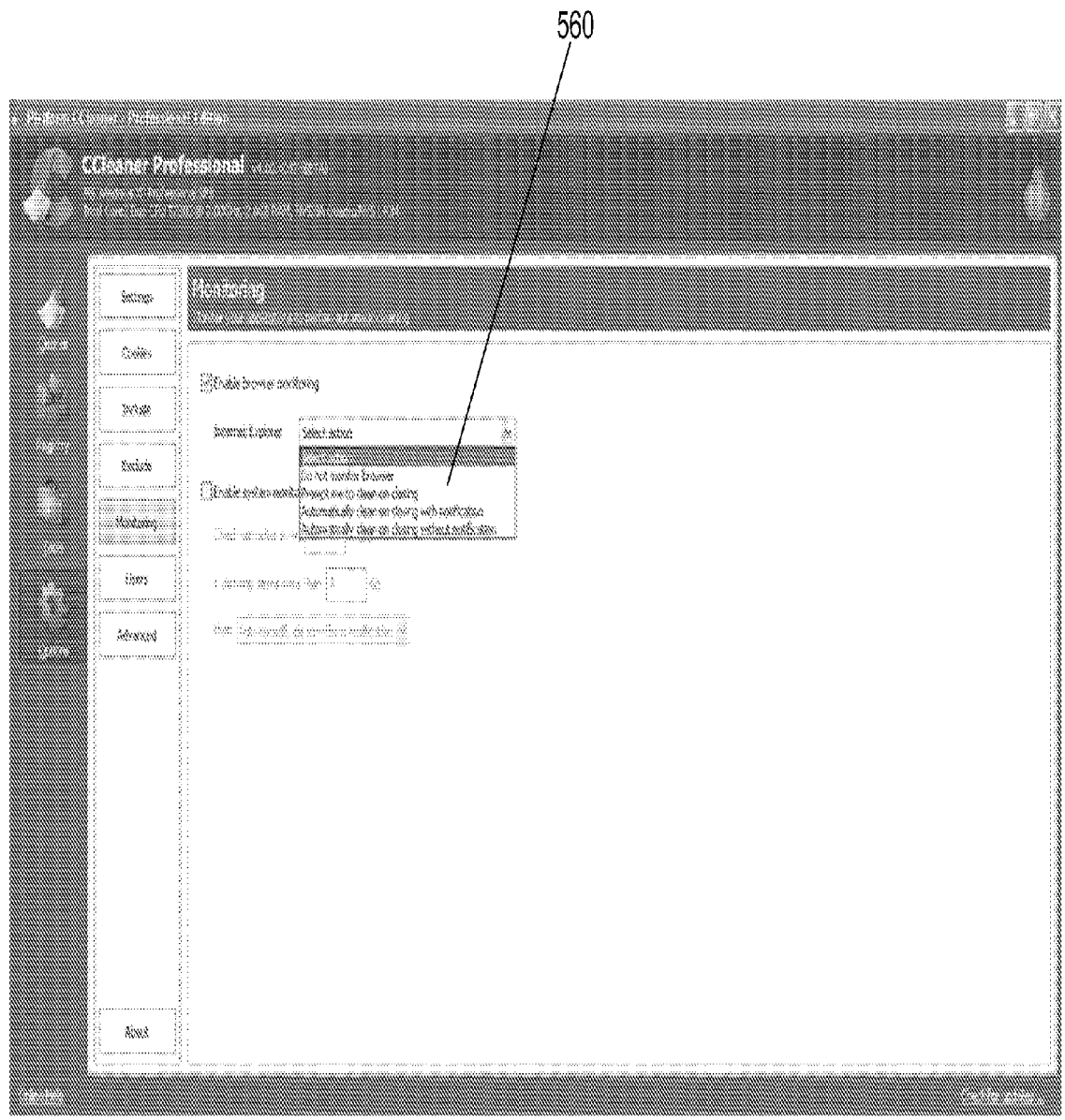
FIG. 6 illustrates a selection window displayed within a user interface of a cleaning module, according to an embodiment of the invention.

FIG. 6 illustrates a selection window 560 displayed within a user interface of a cleaning module, according to an embodiment of the invention. According to the embodiment, selection window 560 is an example selection window that can be displayed within a user interface. Selection window 560 displays one or more pre-defined actions that can be defined for a browser application installed on a computer. As previously described, a user can select a pre-defined action from the list of one or more pre-defined actions displayed within the selection window, and can define the selected pre-defined action for the browser application. In the illustrated embodiment of FIG. 6, selection window displays the following pre-defined actions: (a) automatically cleaning at least one of one or more files or a registry associated with the browser application, and notifying a user of the computer of the automatic cleaning (illustrated in FIG. 6 as "Automatically clean on closing with notification"); (b) automatically cleaning at least one of one or more files or a registry associated with the browser application (illustrated in FIG. 6 as "Automatically clean on closing without notification"); (c) prompting the user of the computer to clean at least one of one or more files or a registry associated with the browser application, and cleaning at least one of one or more files or a registry associated with the browser application in response to receiving an instruction to clean from the user of the computer (illustrated in FIG. 6 as "Prompt me to clean on closing"); or (d) ignoring the closing of the browser application (illustrated in FIG. 6 as "Do not monitor browser"). However, this is only an example embodiment, and in alternate embodiments, selection window 560 can display any pre-defined actions that can be defined for a browser application installed on the computer.

Specifics of the file cleaning and registry cleaning performed by a cleaning module that is executed on a computer are now described in greater detail, in accordance with one embodiment. According to the embodiment, the cleaning module can determine application information from the computer. In one embodiment, the application information includes an application list that represents one or more applications that are installed on the computer. In one embodiment, the cleaning module generates the application list by determining whether one or more applications are installed on the computer. According to the embodiment, the cleaning module can include a list of applications that are commonly installed on a computer within the application list, such as Microsoft® Internet Explorer®, Mozilla® Firefox®, Apple® Safari®, Google® Chrome®, and Opera®. The cleaning module can also include, within the application list, a list of locations on the computer that the cleaning module can analyze to determine whether such an application is installed. In one embodiment, the list of locations includes a list of file locations. In another embodiment, the list of locations includes a list of registry entries. In yet another embodiment, the list of locations includes a combination of both a list of file locations and a list of registry entries. According to the embodiment, if the cleaning module determines that an application is installed, the cleaning module can include that application in the application list. If the cleaning module determines that the application is not installed, the cleaning module can exclude that application from the application list.

Further, according to an embodiment, the cleaning module can select which applications from the application list are to be cleaned, and which applications from the application list are not to be cleaned. Furthermore, regarding the applications that are to be cleaned, the cleaning module can configure which items corresponding to the application are to be removed, where the items can include files, registry entries, data from files, data from registry entries, or a combination therein.

Subsequently, the cleaning module can determine a cleaning rule set, where the determining of the cleaning rule set can be based on the application information. In on embodiment, the cleaning rule set includes one or more cleaning rule identities, where a cleaning rule identity is an identity that uniquely identifies a cleaning rule. A cleaning rule includes one or more parameters for cleaning one or more files and/or a registry of the computer. The parameters of the cleaning rule instruct cleaning module on what items to remove when applying the cleaning rule, where the items can include files, registry entries, data from files, data from registry entries, or a combination therein. A cleaning rule can be stored within a cleaning module.

According to the embodiment, the cleaning module can generate an instruction to clean one or more files and/or a registry of the computer, where the instruction can be based on the cleaning rule set. According to the embodiment, the instruction instructs the cleaning module, for each cleaning rule identity of the cleaning rule set, to apply a cleaning rule that corresponds to the cleaning rule identity. By instructing the cleaning module to apply a cleaning rule, the instruction instructs the cleaning module to perform at least one of the following: removing one or more files; removing data from one or more files; removing one or more registry entries; or removing data from one or more registry entries. Thus, the instruction can instruct the cleaning module to perform file cleaning, registry cleaning, or a combination of the two.

In an alternate embodiment, the cleaning module can generate an instruction to analyze, rather than clean, one or more files and/or a registry, where the instruction can be based on the cleaning rule set. In the alternate embodiment, the instruction instructs the cleaning module, for each cleaning rule identity of the cleaning rule set, to apply a cleaning rule that corresponds to the cleaning rule identity. By instructing the cleaning module to apply a cleaning rule, the instruction instructs the cleaning module to perform at least one of the following: identifying one or more files to be removed; identifying data from one or more files to be removed; identifying one or more registry entries to be removed; or identifying data from one or more registry entries to be removed.

According to an embodiment, a cleaning rule can be one of three types of cleaning rules: a system cleaning rule that can be applied to clean at least one of one or more files and one or more registry entries; an application cleaning rule that can be applied to clean at least one of one or more files and one or more registry entries; or a registry cleaning rule that can be applied to clean one or more registry entities.

A system cleaning rule is a cleaning rule for the cleaning of at least one of one or more files, and one or more registry entries, corresponding to a system component of a computer, rather than a specific application. According to one embodiment, examples of system components include the following components: Recycle Bin, Temporary Files, Clipboard, Memory Dumps, Chkdsk File Fragments, Windows Log Files, Windows Error Reporting, DNS Cache, FTP Accounts, Start Menu Shortcuts, and Desktop Shortcuts. One of ordinary skill in the art would readily appreciate that these components are merely example components, and a system cleaning rule can clean other system components of a computer.

According to an embodiment, the following is an example system cleaning rule for cleaning the Windows Log Files component:
[Windows Log Files]
ID=1017
LangSecRef=3003
LangRef=3145
Default=True
FileKey1=%SystemDirectory%\wbem\Logs|*.log
FileKey2=%SystemDirectory%\wbem\Logs|*.lo_
FileKey3=%windir%|*.log
FileKey4=%windir%|*.bak
FileKey5=%windir%|*log.txt
FileKey6=%commonappdata%\Microsoft\Dr Watson|*.log
FileKey7=%commonappdata%\Microsoft\Dr Watson|*.dmp
FileKey8=%windir%\Debug|*.log
FileKey9=%windir%\Debug\UserMode|*.log
FileKey10=%windir%\Debug\UserMode|*.bak
FileKey11=%windir%|ScheduLgU.txt
FileKey12=%windir%\security\logs|*.log
FileKey13=%windir%\security\logs|*.old According to the embodiment, the system cleaning rule includes an ID parameter, whose value represents a cleaning rule identity. The system cleaning rule also includes a LangSecRef parameter and a LangRef parameter, whose values represent a system component or application to be cleaned. In addition, the system cleaning rule includes a Default parameter, whose value indicates whether the cleaning rule is applied as a default. The system cleaning rule also includes the following parameters: FileKey1, FileKey2, FileKey3, FileKey4, FileKey5, FileKey6, FileKey7, FileKey8, FileKey9, FileKey10, FileKey11, FileKey12, and FileKey13. Each of these parameters is an example of a FileKey parameter. A FileKey parameter indicates specific files that are cleaned when the cleaning rule is applied.

In an alternate embodiment, a system cleaning rule can include a DetectFile parameter, a Detect parameter, or a combination of the two. The DetectFile parameter can be used to detect the presence of a system component or application by looking for specific files. The Detect parameter can be used to detect the presence of a system component or application by looking for specific registry entries. In the alternate embodiment, a system cleaning rule can also include any number of RegKey parameters. A RegKey parameter indicates specific registry entries that are cleaned when the cleaning rule is applied.

One of ordinary skill in the art would readily appreciate that the system cleaning rule shown above is only an example, and that a system cleaning rule may take different forms and still be within the scope of the invention.

An application cleaning rule is a cleaning rule for the cleaning of at least one of one or more files, and one or more registry entries, corresponding to a specific application of a computer. According to one embodiment, examples of applications include the following applications: Mozilla® Firefox®, Opera®, Apple® Safari®, Google® Chrome®, Adobe® Acrobat Reader®, Adobe® ImageReady®, Adobe® Photoshop®, Adobe® Illustrator®, Yahoo® Toolbar, Windows Live® Toolbar, Google® Toolbar, Google® Deskbar®, Google® Calendar Sync®, Google® Talk®, Microsoft® Windows Media Player®, Real® Player, Quicklime® Player, Adobe® Paint Shop Pro®, Microsoft® Works®, Microsoft® Office®, Installshield® Developer®, Macromedia® Flash®, Adobe® Flash Player®, Macromedia® Homesite®, Macromedia® Fireworks®, Macromedia® Dreamweaver®, Macromedia® Shockwave®, and Microsoft® Silverlight®. One of ordinary skill in the art would readily appreciate that these applications are merely example components, and an application cleaning rule can clean other applications of a computer.

According to an embodiment, the following is an example application cleaning rule for cleaning an Internet cache of Mozilla® Firefox®:
[Mozilla-Internet Cache]
ID=2001
LangSecRef=3026
Default=True
SpecialDetect=DET_MOZILLA
SpecialKey1=N_MOZ_CACHE According to the embodiment, the application cleaning rule includes an ID parameter, whose value represents a cleaning rule identity. The application cleaning rule also includes a LangSecRef parameter, whose values represent a system component to be cleaned. In addition, the application cleaning rule includes a Default parameter, whose value indicates whether the application cleaning rule is applied as a default. The application cleaning rule also includes the following parameters: SpecialDetect and SpecialKey1. The values for the parameters SpecialDetect and SpecialKey1 represent dedicated functions that are used to detect applications or system components and clean them.

In an alternate embodiment, an application cleaning rule can include a DetectFile parameter, a Detect parameter, or a combination of the two, which have previously been described. In the alternate embodiment, an application cleaning rule can also include any number of FileKey parameters and/or RegKey parameters, both of which have also previously been described.

One of ordinary skill in the art would readily appreciate that the application cleaning rule shown above is only an example, and that an application cleaning rule may take different forms and still be within the scope of the invention.

A registry cleaning rule is a cleaning rule for the cleaning one or more registry entries of a computer. According to one embodiment, examples of registry cleaning rules include the following examples:
  Missing Shared Dynamically Linked Libraries (DLLs)—Removes entry for a library which is shared by multiple programs that no longer exist;
  Unused File Extensions—Removes entries for file extensions that are no longer associated with installed applications;
  ActiveX and Class Issues—Removes invalid entries from COM/ActiveX object that refer to a non-existing file;
  Type Libraries—Removes invalid entries for type library that refer to an non-existing file;
  Applications—Removes invalid entries for non-existent programs;
  Fonts—Removes invalid entries for fonts that no longer exist in a Windows Fonts folder;
  Application Paths—Removes entries for registered application path that no longer exists;
  Help Files—Removes entries referring to Help files that no longer exist;
  Installer—Removes unnecessary uninstallers or the remnants of previous uninstallations;
  Obsolete Software—Removes entries for applications that are no longer installed;
  Run At Startup—Removes entries for Startup applications that no longer exist;
  Start Menu Ordering—Removes entries for Start menu application that no longer exist; and
  MUI Cache—Removes invalid entries from a chance of recently run programs.

One of ordinary skill in the art would readily appreciate that these are merely example registry cleaning rules, and that other registry cleaning rules can be included.

According to an embodiment, the following is an example registry cleaning rule for cleaning missing shared DLLs:
[Missing Shared DLLs]
LangSecRef=3501
LangRef=3601
Default=True
SpecialKey1=R_SHARED_DLLS According to the embodiment, the registry cleaning rule includes an ID parameter, whose value represents a cleaning rule identity. The registry cleaning rule also includes a LangSecRef parameter and a LangRef parameter, whose values represent one or more registry entries to be cleaned. In addition, the registry cleaning rule includes a Default parameter, whose value indicates whether the registry cleaning rule is applied as a default. The application cleaning rule also includes a SpecialKey1 parameter, whose value represents a dedicated function that is used to detect registry entries and clean them.

In an alternate embodiment, a registry cleaning rule can include a Detect parameter, which has previously been described. In the alternate embodiment, an application cleaning rule can also include any number of RegKey parameters, which also have previously been described.

One of ordinary skill in the art would readily appreciate that the registry cleaning rule shown above is only an example, and that a registry cleaning rule may take different forms and still be within the scope of the invention.

According to an alternate embodiment, a cleaning module can also generate an instruction to clean one or more databases of a computer, where the instruction is based on the cleaning rule set. According to the alternate embodiment, the instruction instructs the cleaning module, for each appropriate cleaning rule identity of the cleaning rule set, to apply a cleaning rule that corresponds to the cleaning rule identity, to perform database cleaning, database optimization, database compacting, or a combination therein, on the one or more databases. As understood by one of ordinary skill in the art, database cleaning refers to removing one or more database records from one or more database tables. The one or more database records can be removed because of various technical or business reasons. For example, the data in the one or more database records may be incomplete or corrupt. As another example, the one or more database records may not be utilized. Database optimization refers to improving speed and functionality of querying the one or more databases, such as creating or modifying one or more indexes. Database compacting refers to compacting data stored in the one or more databases, so that the one or more databases require a smaller amount of storage space on the computer. According to the alternate embodiment, the cleaning module can clean one or more databases of the computer based on the generated instruction and the cleaning rule set.

According to another alternate embodiment, a cleaning module can also generate an instruction to optimize one or more browser applications of a computer, where the instruction is based on the cleaning rule set. A browser application, as previously described, is an application configured to retrieve, present, and traverse information resources over the Internet, such as the World Wide Web. Examples of a browser application include Microsoft® Internet Explorer®, Mozilla® Firefox®, Apple® Safari®, Opera®, and Google® Chrome®. Optimizing a browser application can include cleaning one or more files associated with the browser application, cleaning one or more registry entries associated with the browser application, cleaning one or more databases associated with the browser application, or a combination therein, as previously described. According to the alternate embodiment, a cleaning module can optimize one or more browser applications of a computer based on the generated instruction and the cleaning rule set.

According to an embodiment, a cleaning module can monitor a browser application, detect a closing of the browser application, and perform a pre-defined action in response to the closing of the browser application. The pre-defined action can include: automatically cleaning one or more files and/or a registry associated with the browser application with a notification; automatically cleaning one or more files and/or a registry associated with the browser application without a notification; prompting a user to clean one or more files and/or a registry associated with the browser application, and cleaning the one or more files and/or the registry associated with the browser application in response to receiving an instruction to clean from the user; or ignoring the closing of the browser application. By providing the user the ability to monitor the browser application, and to customize an action that can be performed upon a closing of the browser application, the cleaning module can provide a more active cleaning process.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method for optimizing the performance of a browser application executable by a processor of a computer, comprising:
    identifying a plurality of files, stored in a memory of the computer, associated with the browser application or a plurality of registry entries, stored in a registry of the computer, associated with the browser application;
    providing, to a user, a graphical user interface including a selectable list of pre-defined actions associated with the browser application, the selectable list of pre-defined actions including:
        cleaning the plurality of files or the plurality of registry entries,
        cleaning the plurality of files or the plurality of registry entries, and providing a cleaning notification to the user via the graphical user interface, and
        prompting the user, via the graphical user interface, whether to clean the plurality of files or the plurality of registry entries, and, in response to receiving a cleaning instruction from the user, cleaning the plurality of files or the plurality of registry entries;
    receiving a selection from the user, via the graphical user interface, of one of the pre-defined actions from the list of pre-defined actions;
    monitoring execution of the browser application on the processor;
    detecting termination of the execution of the browser application; and
    in response to detecting termination of the execution of the browser application, performing the selected pre-defined action on the computer,
    wherein cleaning the plurality of files includes deleting at least one file from the memory, or removing data from at least one file stored in the memory, and
    wherein cleaning the plurality of registry entries includes deleting at least one registry entry from the registry, or removing data from at least one registry entry stored in the registry.

2. The method of claim 1, wherein the selectable list of pre-defined actions includes not cleaning the plurality of files or the plurality of registry entries in response to detecting termination of the execution of the browser application.

3. The method of claim 1, wherein the prompting the user further comprises, displaying, via the graphical user interface, a window to receive a cleaning instruction from the user.

4. The method of claim 1, wherein a unique pre-defined action is defined for each browser application installed on the computer.

5. The method of claim 1, further comprising defining the pre-defined action for the browser application.

6. The method of claim 1, wherein cleaning the plurality of files or the plurality of registry entries is based on an instruction and a cleaning rule set.

7. The method of claim 6, further comprising:
one or more unique cleaning rules;
wherein the cleaning rule set comprises one or more cleaning rule identities;
wherein each cleaning rule identity corresponds to a unique cleaning rule; and
wherein each unique cleaning rule comprises a set of one or more parameters for cleaning one or more files or one or more registry entries associated with the browser application.

8. The method of claim 7, wherein each cleaning rule identity corresponds to an application cleaning rule or a registry cleaning rule.

9. A non-transitory computer-readable medium having a computer program stored thereon that, when executed by a processor, causes the processor to implement a method for optimizing the performance of a browser application executable by a processor of a computer, said optimizing the performance comprising:
identifying a plurality of files, stored in a memory of the computer, associated with the browser application or a plurality of registry entries, stored in a registry of the computer, associated with the browser application;
providing, to a user, a graphical user interface including a selectable list of pre-defined actions associated with the browser application, the selectable list of pre-defined actions including:
cleaning the plurality of files or the plurality of registry entries,
cleaning the plurality of files or the plurality of registry entries, and providing a cleaning notification to the user via the graphical user interface, and
prompting the user, via the graphical user interface, whether to clean the plurality of files or the plurality of registry entries, and, in response to receiving a cleaning instruction from the user, cleaning the plurality of files or the plurality of registry entries;
receiving a selection from the user, via the graphical user interface, of one of the pre-defined actions from the list of pre-defined actions;
monitoring execution of the browser application on the processor;
detecting termination of the execution of the browser application; and
in response to detecting termination of the execution of the browser application, performing the selected pre-defined action on the computer,
wherein cleaning the plurality of files includes deleting at least one file from the memory, or removing data from at least one file stored in the memory, and
wherein cleaning the plurality of registry entries includes deleting at least one registry entry from the registry, or removing data from at least one registry entry stored in the registry.

10. The non-transitory computer-readable medium of claim 9, wherein the selectable list of pre-defined actions includes not cleaning the plurality of files or the plurality of registry entries in response to detecting termination of the execution of the browser application.

11. The non-transitory computer-readable medium of claim 9, wherein prompting the user further comprises, displaying, via the graphical user interface, a window to receive a cleaning instruction from the user.

12. The non-transitory computer-readable medium of claim 9, wherein a unique pre-defined action is defined for each browser application installed on the computer.

13. The non-transitory computer-readable medium of claim 9, wherein the optimizing further comprises defining the pre-defined action for the browser application.

14. The non-transitory computer-readable medium of claim 9, wherein cleaning the plurality of files or the plurality of registry entries is based on an instruction and a cleaning rule set.

15. The non-transitory computer-readable medium of claim 14, wherein the optimizing further comprises:
one or more unique cleaning rules;
wherein the cleaning rule set comprises one or more cleaning rule identities;
wherein each cleaning rule identity corresponds to a unique cleaning rule; and
wherein each unique cleaning rule comprises a set of one or more parameters for cleaning one or more files or one or more registry entries associated with the browser application.

16. The non-transitory computer-readable medium of claim 15, wherein each cleaning rule identity corresponds to an application cleaning rule or a registry cleaning rule.

17. An apparatus, comprising:
a memory storing a cleaning module for optimizing the performance of a browser application; and
a processor configured to execute the cleaning module stored in the memory, the processor being further configured, when executing the cleaning module stored in the memory, to:
identify a plurality of files, stored in a memory of the computer, associated with the browser application or a plurality of registry entries, stored in a registry of the computer, associated with the browser application,
provide, to a user, a graphical user interface including a selectable list of pre-defined actions associated with the browser application, the selectable list of pre-defined actions including:
cleaning the plurality of files or the plurality of registry entries, and providing a cleaning notification to the user via the graphical user interface, and
prompting the user, via the graphical user interface, whether to clean the plurality of files or the plurality of registry entries, and, in response to receiving a cleaning instruction from the user, cleaning the plurality of files or the plurality of registry entries;
receive a selection from the user, via the graphical user interface, of one of the pre-defined actions from the list of pre-defined actions,
monitor execution of the browser application on the processor,
detect termination of the execution of the browser application, and
in response to detecting termination of the execution of the browser application, perform the selected pre-defined action on the computer,
wherein cleaning the plurality of files includes deleting at least one file from the memory, or removing data from at least one file stored in the memory, and
wherein cleaning the plurality of registry entries includes deleting at least one registry entry from the registry, or removing data from at least one registry entry stored in the registry.

18. The apparatus of claim 17, wherein the selectable list of pre-defined actions includes not cleaning the plurality of files or the plurality of registry entries in response to detecting termination of the execution of the browser application.

19. The apparatus of claim 17, wherein prompting the user further comprises displaying, via the graphical user interface, a window to receive a cleaning instruction from the user.

20. The apparatus of claim 17, wherein a unique pre-defined action is defined for each browser application installed on the computer.

21. The apparatus of claim 17, wherein the processor is further configured to define the pre-defined action for the browser application.

22. The apparatus of claim 17, wherein cleaning the plurality of files or the plurality of registry entries is based on an instruction and a cleaning rule set.

23. The apparatus of claim 22, further comprising:
one or more unique cleaning rules;
wherein the cleaning rule set comprises one or more cleaning rule identities;
wherein each cleaning rule identity corresponds to a unique cleaning rule; and
wherein each unique cleaning rule comprises a set of one or more parameters for cleaning one or more files or one or more registry entries associated with the browser application.

24. The apparatus of claim 23, wherein each cleaning rule identity corresponds to an application cleaning rule or a registry cleaning rule.

* * * * *